United States Patent [19]
Falkenstein

[11] 4,196,848
[45] Apr. 8, 1980

[54] AUTOMATIC THERMOSTAT SET-BACK CONTROL SYSTEM

[76] Inventor: Roger Falkenstein, 1007 N. 13th St., Bismarck, N. Dak. 58501

[21] Appl. No.: 36,859

[22] Filed: May 7, 1979

[51] Int. Cl.² ............................................... F23N 5/20
[52] U.S. Cl. .................................. 236/46 R; 236/47
[58] Field of Search ............... 236/46 R, 47; 165/12; 337/301–303

[56] References Cited
U.S. PATENT DOCUMENTS

| 3,917,165 | 11/1975 | Cross | 236/47 X |
| 3,948,441 | 4/1976 | Perkins et al. | 236/47 X |

Primary Examiner—William E. Wayner
Attorney, Agent, or Firm—Blair, Brown & Kreten

[57] ABSTRACT

A set-back control is disclosed which operates relays which are wired in series with heating, ventilating and air conditioning control circuits to effect reduction of energy to maintain building temperatures on a scheduled basis.

9 Claims, 4 Drawing Figures

AUTOMATIC THERMOSTAT SET-BACK CONTROL SYSTEM

BACKGROUND OF THE INVENTION

The automatic set-back control system is a control device for automatically regulating the flow of energy providing substance to single or multiple heating and-/or air conditioning sources in order to effect optimum usage of energy. The device is particularly adapted to control thermostats in any type of new or existing structure which is heated or air conditioned, in accordance with day and night or occupancy and non-occupancy heating and/or air conditioning requirements. The control system comprises components of which a portion will be generally preassembled in a compact unit, which is simple to install and adjust.

The components associated therewith consist of a timer operated switch; a double pole double throw switch, a light, a stepdown transformer, a thermostat, and the normally closed contact relays.

Prior art devices of which applicant is aware include the following 7 patents;

| | |
|---|---|
| 2,898,047 Gaddis | 3,972,471 Ziegler |
| 3,891,144 Sadler et al. | 3,989,928 Scragg et al |
| 3,917,165 Cross | 4,078,720 Nurnberg |
| 3,949,936 Boyer et al | |

The switch and the light in the Cross patent (which appears most germaine) have a function different from the function of the manual switch and light in the instant set-back control. The switch in the Cross set-back control is used to keep the control of the heating system at the low heat thermostat setting, independent of the switching of the time clock. The switch control disclosed hereinafter is used to manually resume the occupied or higher energy requirement, settings on the existing temperature control thermostats. The light in the Cross control is used to indicate when the coil relay is automatically energized, switching control to the low heat thermostat. The light used in the instant set-back control simply indicates when the manually operated switch is in the position whereby set-back cycling is bypassed, and occupied temperatures are maintained.

Another advantage of the instant system over the Cross patent is that it may control not only heating circuits but also air conditioning and ventilation control circuits.

OBJECTS AND SUMMARY OF THE INVENTION

An object of the invention is a low cost device, substantially free of maintenance, which is easy to install, and retrofits to any type of heating and/or cooling systems with electric thermostat controls, and has the flexibility of controlling multiple thermostats, and multiple heating zones.

This improved control system consists of a timer 1, a stepdown transformer 11, 110/24 VAC, a thermostat 21 with double throw switching action, a double pole, double throw switch 17, a 110 volt AC light 31, and one or several 24 volt coil relay(s) 42 with double throw switch contacts. This is connected to an existing or new heating, ventilating and/or air conditioning control system with a single thermostat 52 or several thermostats, which control the energy providing machinery by means of electrical connections 50 and 51 which may carry 24 volt, 110 volt, or 208/240 volt AC current. In the case of a building system where there is one or more secondary heating zones, additional thermostats 56 are used in the thermostat set-back control system. The set-back control can be utilized in any type of building, but its primary application will likely be in commercial or industrial buildings where scheduled occupancy and unoccupancy occurs.

Another object and main advantage of the instant set-back control system is that in a heating zone, which may consist of a large open area or several small rooms in an area of a building, multiple thermostats may be used to control multiple heating or air conditioning units or ventilation dampers. When a building is unoccupied, which is often the case at scheduled intervals in commercial and industrial buildings, generally only one thermostat is needed to control the temperature in that zone. The use of fewer thermostats, then, are required, (for example as in a system as claimed in the Cross patent) and same greatly reduces the cost of an automatic set-back control system and also simplifies the setting of the control, where multiple thermostats exist.

According to energy conservation experts, when a building is unoccupied, air conditioning is not necessary. This system is designed so that when the set-back control cycles, the air conditioning control circuit will be interrupted during the unoccupied period and no air conditioning will be supplied until the building is occupied again. All of the components used in the set-back control are low cost items. Also the small number of components used in the set-back control make it simple to assemble.

The combination of the simplicity of the automatic thermostat set-back control system, the ease of installation, the low cost of the components and the great capabilities it possesses makes this system the most economical and effective set-back control system of its kind.

These and other objects will be made manifest when considering the following detailed drawings and specification.

DESCRIPTION OF THE PREFERRED EMBODIMENT

Figure 1:
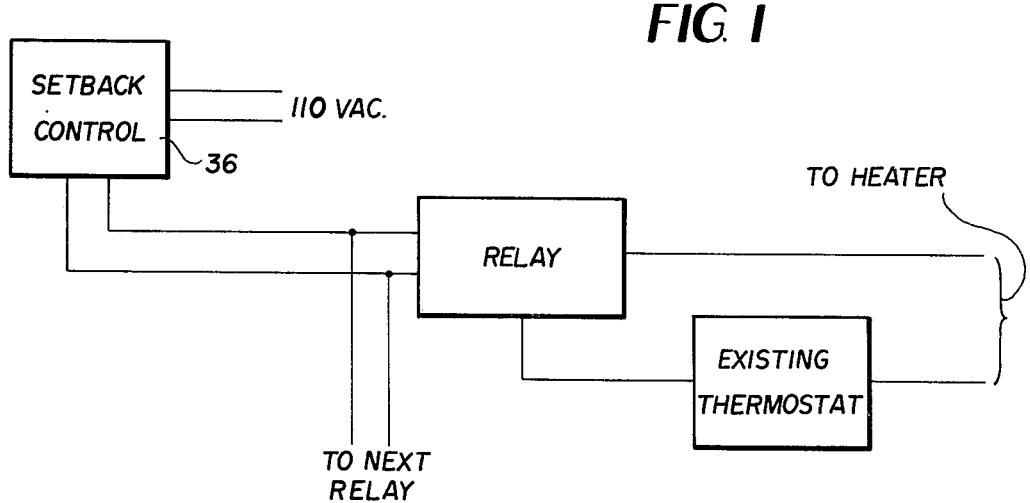
FIG. 1 shows a schematic of a typical installation of the apparatus according to the present invention.
Figure 2:
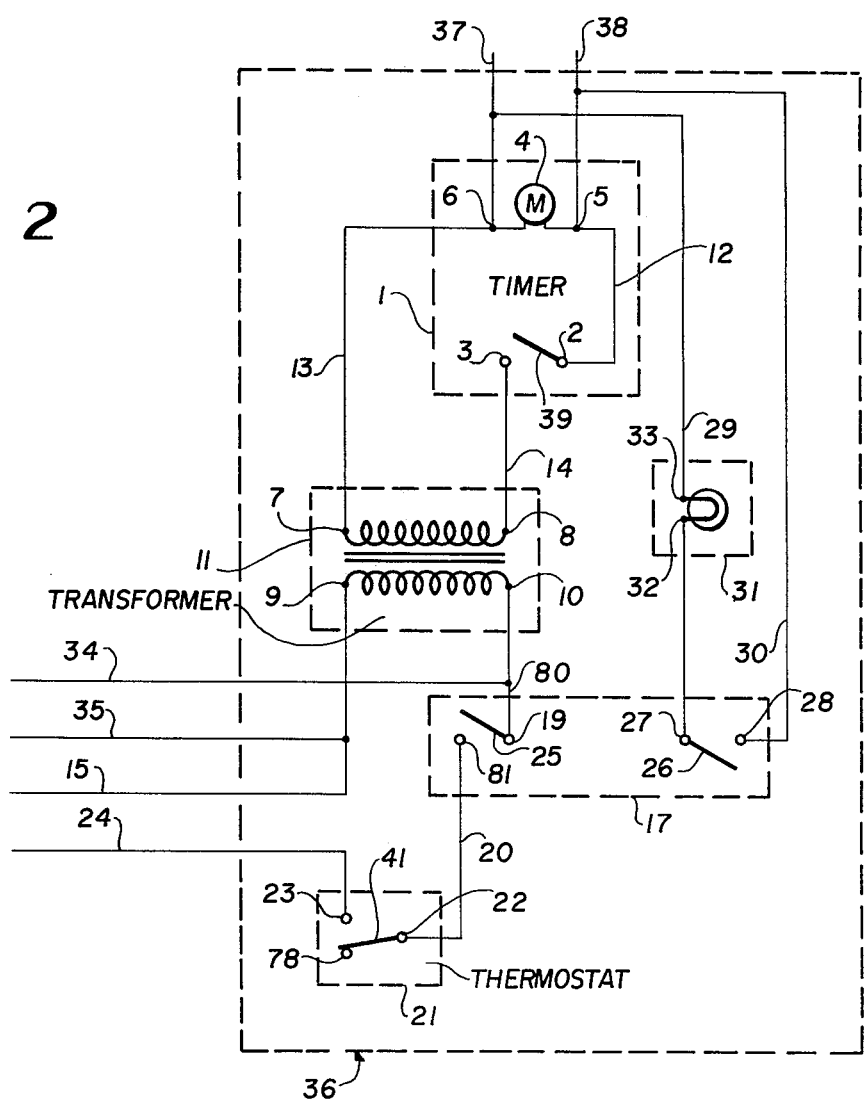
FIG. 2 details the circuitry of the set-back control portion of FIG. 1.
Figure 3:
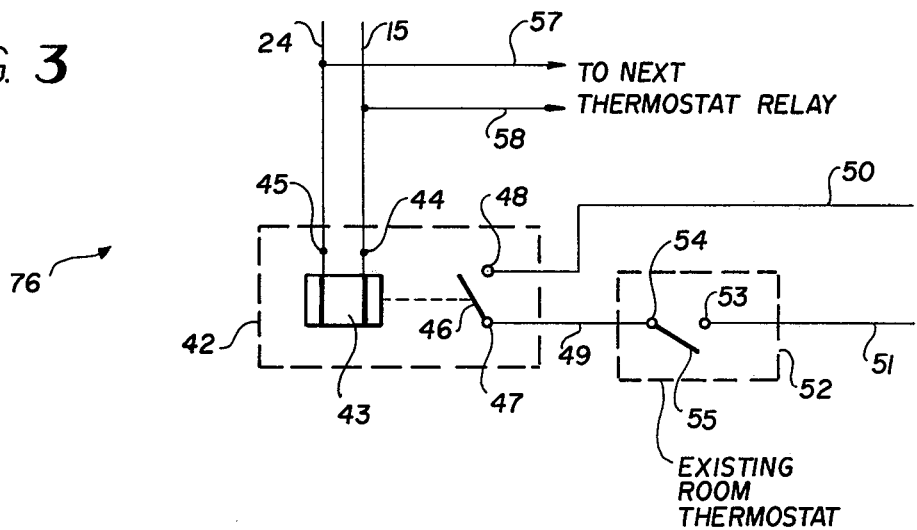
FIG. 3 defines the circuitry of a "primary zone" circuit used with FIG. 2.
Figure 4:
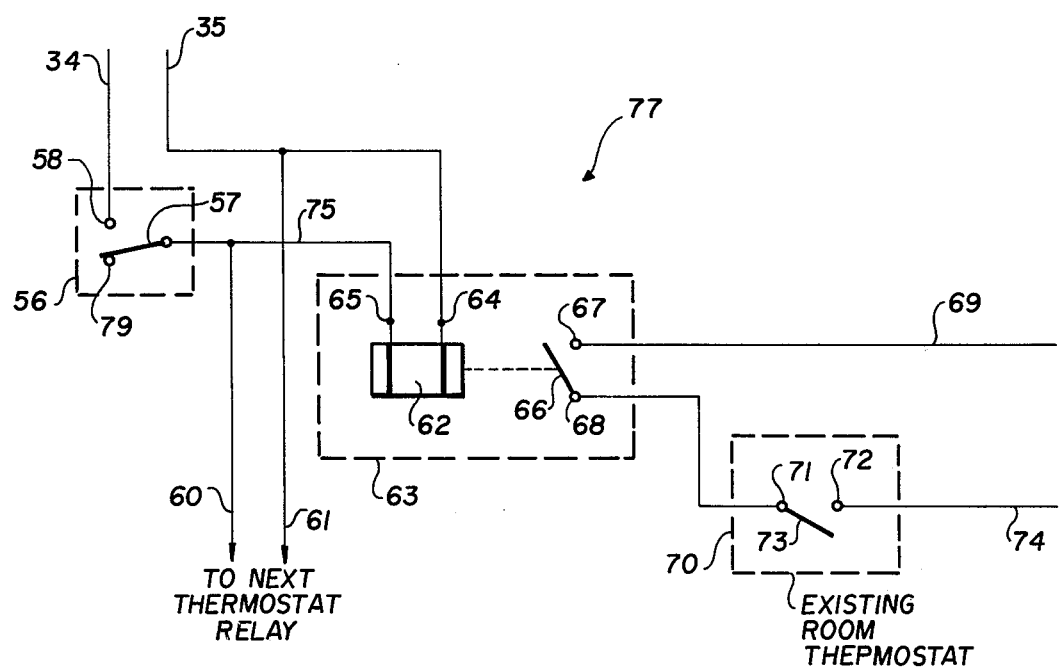
FIG. 4 defines the circuitry of a "secondary zone" circuit used with FIG. 2.

Referring to the drawings, now, wherein like numerals refer to like parts throughout the assembly outlined and labeled 36 is the "set-back control", which may be assembled separately in an area, but preferably preassembled in a compact housing for portability and ease of installation. The combined assembly of the set-back control 36, the primary zone circuit 76 and (in some cases) the secondary zone circuit 77 defines the set-back control system. Also the primary zone is the temperature controlled area where the set-back control is located and the secondary zone is a temperature controlled area which is essentially thermally independent of the primary zone, separated for example by a wall and by heat supplied by separate heating unit. The temperature settings on existing heating or airconditioning control thermostats 52 and 70 will be call occupied settings and the temperature settings on the set-back control thermostats will be referred to as unoccupied settings.

The timer 1 will be a type powered by an external 110 VAC source. The clock motor 4 will activate the switch arm 39 to electrically connect and disconnect terminals 2 and 3. This timer may repeat a switching action every 24 hour period or may have seven day flexibility to accommodate different building occupancy schedules each day of the week. The 110 volt power source is connected to the timer 1 by means of connectors 37 and 38 attached to terminals 5 and 6 on the timer. During the period when the building is to begin to be unoccupied, the timer is set so the switch arm 39 closes to connect terminals 2 and 3. This completes the circuit consisting of connectors 12, 13 and 14, terminals 2, 3, 5, 6, 7, 8 and the primary side of the stepdown transformer 11. Then transformer 11 provides 24 volt A.C. power on its secondary side at terminals 9 and 10. Thermostat 21 is one of a type which has a temperature setting range of at least 40 degrees F. to 80 degrees F. Thermostat 21 has a double throw switching action such that when the temperature in the primary zone falls below the unoccupied setting on the thermostat 21, switch arm 41 connects terminals 22 and 78 and disconnects terminals 22 and 23. Initially assume the temperature in the primary zone is above the unoccupied setting; the switch arm 41 will therefore connect terminals 22 and 23. Assuming the manually operated switch 17 has the switch arm 25 closed to connect terminals 19 and 81 and the circuit consisting of connectors 15, 20, 24 and 80, terminals 9, 10, 19, 22, 23, 44, 45, 81, and the switch arms 41 and 46 is completed, this will provide 24 VAC power to terminals 44 and 45 of the 24 volt relay coil 43 of relay 42. This in turn will disconnect terminals 47 and 48 on the contact side of relay 42 by means of switch arm 46. The relay 42 is provided with a normally closed contact switch action such that terminals 47 and 48 are electrically connected by means of switch arm 46 when no 24 volt AC power is provided to relay coil 43. The heating or cooling control circuits must complete a circuit to activate the heating or cooling units. Generally in a thermostat where one or more operations (heating, cooling, and/or ventilation) is controlled there is one wire, referred to as a 'common wire'; which if disconnected will break the temperature control circuit and thus not allow continued operation of the heating, cooling, or ventilating units. The relay terminals 47 and 48 are placed in series with this common wire 49 and 50. To begin, assume that the room thermostat 52 shall control a heating unit only. Thermostat 52 shall be set at the occupied temperature setting and shall have a switching action such that switch arm 55 will connect terminals 53 and 54 to complete the heating control circuit when the room temperature falls below the occupied setting and switch arm 55 will disconnect terminals 53 and 54 when heat providing unit causes the room temperature to rise above the occupied setting. When the coil 43 of relay 42 is energized the heating control circuit will not be completed even as the temperature falls below the occupied setting on the thermostat 52 and switch arm 55 is closed to connect terminals 53 and 54. The room temperature will continue to fall during the unoccupied period until the zone temperature falls below the unoccupied setting on thermostat 21. At that time switch arm 41 will disconnect terminals 22 and 23 thus deenergizing coil 43 of relay 42 and terminals 47 and 48 will be connected by switch arm 46. This will in turn complete the heating control circuit and the heat providing unit or units in the zone will begin to operate and raise the zone temperature. As the temperature rises above the unoccupied setting on the thermostat 21 the switch arm 41 will again connect terminals 22 and 23 and as previously described, will break the heating control circuit and will shut off the heat unit or units. This cycling during the unoccupied period will maintain the temperature in the zone 76 near the unoccupied setting on thermostat 21. In cases where multiple thermostats are located in the primary zone additional relays similar to relay 42 can be connected in series with other control circuits in the same manner as illustrated in the drawing. The coils of the relays must be wired electrically in parallel to coil 43 by means of electrical connectors 57 and 58. All the relays in the primary zone will operate simultaneously with relay 42 and likewise during the unoccupied period all of the heating units in the primary zone will operate simultaneously.

When scheduled building occupancy is to resume switch arm 39 will automatically disconnect terminals 2 and 3 thus deenergizing the transformer 11. This will discontinue the 24 volt circuit to the relay 42 regardless of the position of switch arm 41 on thermostat 21 and the heating control circuit is again completed so the heating unit(s) will raise the zone temperature to the occupied setting on the thermostat 52. This in effect raises and lowers the temperature maintained in the building's zone according to when the building is normally occupied and unoccupied respectively.

Next assume that thermostat 52 is controlling an air conditioning unit. In this case switch arm 55 would connect terminals 54 and 53 when the temperature in the room rose above the occupied setting, for example 75 degrees F. The unoccupied setting on thermostat 21 will remain at a temperature used during the heating season, for example 55 degrees F. As long as the temperature in the primary zone remained above 55 degrees F. switch arm 21 will continue to connect terminals 22 and 23. When the set-back control cycles to the unoccupied period the circuit consisting of transformer 11, switch arm 25, thermostat 21, and relay coil 43 is completed and switch arm 46 remains open to discontinue the circuit which would allow any operation of the air conditioning unit. If the temperature in the zone during the unoccupied period for some reason falls below the unoccupied setting 55 degrees F. this would cause switch arm 41 to close and as a result switch arm 46 of relay 42 would close. The air conditioning unit would not, however start because the temperature would be far below the occupied temperature setting and switch arm 55 would remain open so the air conditioning unit control circuit would not be complete and no air conditioning would be provided. So the set-back control system will discontinue air conditioning during the period when the building is unoccupied.

In nearly all buildings this is a desirable operation because generally no cooling is necessary when a building is not occupied. In the special case where simply a higher unoccupied temperature setting would be desirable, for example 85 degrees F. as opposed to 75 degrees F. for an occupied setting, during the air conditioning season. This function can be accomplished easily with the automatic set-back control system by making one simple alteration to the set-back control circuit. Electrical connector 24 can simply be removed from terminal 23 of thermostat 21 and attached to terminal 78. (This could be done by means of a manual switch also). The unoccupied setting on thermostat 21 would be set for example at 85 degrees F. When the unoccupied period begins, the zone temperature may be at 75 degrees F. At this time, switch 41 will be connecting terminals 22 and 78. This will complete the circuit consisting of the secondary side of transformer 11, switch arm 25, thermostat 21 and relay coil 43. This will keep switch arm 46 open and discontinue the air conditioning control circuit. The zone temperature may then rise to the unoccupied setting of 85 degrees F. As the temperature rises above 85 degrees F., the switch arm 41 of thermostat 21 will disconnect terminals 22 and 78. This will then break the set-back control system circuit causing switch arm 46 of relay 42 to connect terminals 47 and 48. Since the zone temperature is far above the occupied setting on thermostat 52, switch arm 55 will be closed, completing the air conditioning control circuit. The zone temperature will then be lowered by the air conditioning unit or units to slightly below the unoccupied temperature setting of 85 degrees F. on thermostat 21. At this time switch arm 41 will reconnect terminals 22 and 78, the set-back control system circuit will be completed and switch arm 46 will be opened to discontinue the air conditioning control circuit. This cycling will then maintain the temperature in the building zone at or below the unoccupied setting on thermostat 21 during unoccupied period. When the occupied period resumes, the 24 volt circuit controlling relay 42 will be discontinued, switch arm 46 will remain closed and the zone will be again maintained at the occupied settings on thermostat 52 and other thermostats in the primary zone.

Often in commercial or industrial buildings a normally unscheduled building occupancy occurs whereby it is desirable to maintain a comfortable occupied temperature setting during the unscheduled occupancy when the automatic thermostat set-back control system has cycled to lower the building temperature to the unoccupied setting. This may be accomplished during the heating season, by adjusting the unoccupied setting on thermostat 21 to a comfortable temperature and the heating units will raise the zone temperature to that temperature setting. However, this can be undesirable because it is easy for building occupants to forget to return the thermostat 21 to a lower unoccupied setting when they leave the building. Also, this method is not effective for resuming occupied temperatures when air conditioning units are controlled. Therefore a feature of the instant automatic thermostat set-back control system has been included which comprises a double pole, double throw switch 17 and a 110 VAC light 31. This allows occupied temperature settings to be easily resumed during a scheduled unoccupied period. Switch 17 consists of switch arm 25 and 26 with terminals 19, 81, 27 and 28. The switch arms 25 and 26 are interconnected such that when switch arm 25 connects terminals 19 and 81, switch arm 26 disconnects terminals 27 and 28. During normal operation of the set-back control system switch arm 25 will remain closed to complete the circuit to allow operation of the relays 42. The resumption of the occupied temperature setting during a scheduled unoccupied period is accomplished by simply manually operating switch 17 so that switch arm 25 electrically disconnects terminals 19 and 81 and the switch arm connects terminals 27 and 28. This causes the interruption of the circuit controlling the relay(s) 42, therefore the normally closed switch arm 46 remains closed so the thermostat 52 controls the temperature again. Switch arm 25 is closed again when the unscheduled occupancy has ended. This then permits normal cycling of the set-back control system to be resumed. A warning light is included with this switch so that when set-back cycling is bypassed and switch arm 25 disconnects terminals 19 and 81 switch arm 26 connects terminals 27 and 28 to complete the 110 VAC circuit through connectors 29 and 30 which are connected to the remote power source in connectors 37 and 38. Light 31 then lights as a warning or reminder to the operator that normal cycling of the set-back control system has been bypassed. When the occupants leave and return switch 17 to the normal position switch arm 26 disconnects terminals 27 and 28, and light 31 goes out.

The description until now has been limited to the operation of the set-back control in the primary zone whereby thermostat 21 senses the temperature in the zone and controls the heating or air conditioning equipment in the primary zone during the unoccupied period. In cases where more than one zone exists, still only one set-back control is needed to automatically reduce heating and air conditioning loads during unoccupied periods in 2 or more zones. For each secondary zone an additional zone thermostat 56 is provided to control the relay(s) 63. This thermostat is identical to thermostat 21 and is placed in the secondary zone remotely from the set-back control 36, connected to the set-back control 36 only by electrical connectors 34 and 35. Electrical connectors 60 and 61 correspond to connectors 57 and 58 whereby additional relay coils controlled in the secondary zone are connected to connectors 60 & 61. This thermostat 56 will control relay 63 and any additional relays in the secondary zone in the same manner as thermostat 21 controls relay 42 and additional relays in the primary zone, as previously described. Hence, automatic reduction of heating and air conditioning requirements is accomplished in the secondary zone or zone according to the same occupancy schedule as is used in the primary zone.

A different unoccupied setting may be maintained in the secondary zone than is maintained in the primary zone by simply adjusting the thermostat 56 to the desired unoccupied setting. If it is desired to maintain an occupied temperature because of an unscheduled occupancy in the secondary zone when the scheduled unoccupied period has begun, an occupied temperature can be resumed either by raising the unoccupied setting on the thermostat 56 or by utilizing a cycling bypass switch similar to switch 17 installed in series with connector 34 and 35. This resumption of the occupied temperature in the secondary zone during an unoccupied period will not then affect the temperature in the primary zone or other secondary zones.

If for some reason, a higher temperature setting is desired during the building unoccupied period when air conditioning is controlled, this may be accomplished by removing connector 24 from terminal 23 of thermostat 21 and attaching connector 24 to terminal 78 of thermostat 21 physically or by means of a manual switch, as previously described.

A portion of the set-back control can be installed remotely from the remainder of the set-back control system to facilitate mounting the set-back control near a 110 VAC power source to reduce the length of the line voltage power connection. An inexpensive low voltage (24 VAC) connector is used to connect the set-back control to the relays used in the set-back control system. Generally it is not required that this low voltage connector be placed in electrical conduit. Also the relay(s) used in the set-back control system need not be placed physically close to the thermostats but may be conveniently located anywhere in the heating, cooling and/or ventilating control circuit. All these factors make this set-back control system very simple and low cost to install, a big advantage over the prior art.

Having thus described the inventon it should be apparent that numerous structural modifications are contemplated as being a part of this invention as set forth hereinabove and defined in the claims.

What is claimed is:

1. A set-back control system for a building or the like having a primary zone, a control circuit including a thermostat connected to an associated source of electric power for controlling the temperature in said primary zone corresponding to an occupied condition, normally closed relay means in said control circuit for connecting said control circuit to said associated source of electric power in accordance with the setting of said thermostat in said control circuit, circuit means arranged to be connected to an associated source of electric power for energizing said relay means, said circuit means including a timer for periodically connecting said circuit means to said associated source of electric power and a primary thermostat responsive to the temperature in said primary zone corresponding to an unoccupied condition, said thermostat in said circuit means being arranged to respond to the temperature in said primary zone for connecting said relay means to said associated source of electric power when said circuit means is connected to said associated source of electric power by said timer to disconnect said control circuit from said associated source of electric power whereby the temperature in said primary zone is maintained at a desired unoccupied level.

2. A set-back control system in accordance with claim 1 wherein said circuit means includes a switch for disconnecting said relay means from said associated source of power to by-pass the control system.

3. A control system in accordance with claim 2 including visual indicator means connected to said switch and to said associated source of electric power for visually indicating the by-passing of the control system.

4. A set-back control system in accordance with claim 3 wherein said switch comprises a manually operated, double pole, double throw switch for connecting said indicator means to said associated source of electric power and for disconnecting said relay means from said associated source of electric power simultaneously.

5. A set-back control system in accordance with claim 1 including a plurality of control circuits each including a thermostat for controlling the temperature in various locations in said primary zone corresponding to an occupied condition, normally closed relay means in each of said control circuits for connecting said control circuits to said associated source of electric power, said normally closed relay means being connected in electrical parallel relationship and connected to said circuit means for simultaneous connection to said associated source of electric power by said primary thermostat in said circuit means.

6. A set-back control system in accordance with claim 1 wherein said building includes a secondary zone separated from said primary zone, a secondary thermostat in said circuit means responsive to the temperature in said secondary zone corresponding to an unoccupied condition, a control circuit including a thermostat for controlling the temperature in said secondary zone corresponding to an occupied condition and normally closed relay means in said control circuit in said secondary zone for connecting said secondary zone control circuit to an associated source of electric power, said secondary thermostat in said circuit means being arranged to respond to the temperature in said secondary zone for connecting said normally closed relay means in said secondary zone control circuit to said associated source of electric power to disconnect said secondary zone relay means from said associated source of electric power whereby the temperature in said secondary zone is maintained at a desired unoccupied level.

7. A set-back control system in accordance with claim 1 wherein said timer is connected to said associated source of electric power and wherein said circuit means includes a stepdown transformer having a primary winding connected to said timer and a secondary winding, a pair of conductors for connecting said secondary winding to said normally closed relay means through said primary thermostat.

8. A set-back control system in accordance with claim 7 wherein said normally closed relay means includes a relay having a coil and a contact movable by said coil in said control circuit, said relay coil being connected to said pair of conductors for energizing said relay coil by said associated source of electric power, said relay contact being movable from a normally closed position in said control circuit into an open position when said relay coil is energized by said associated source of electric power.

9. A set-back control system in accordance with claim 8 including a manually operated switch in one of said pair of conductors manually movable between a closed position and an open position for interrupting the connection of said relay coil to said associated source of electric power.

* * * * *